Figure 1:
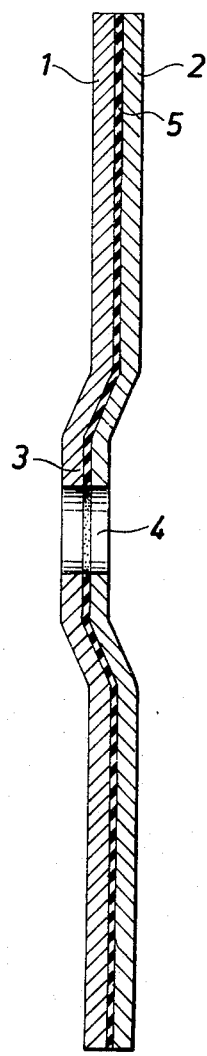

United States Patent [19]

Malm

[11] 4,062,153
[45] Dec. 13, 1977

[54] SILENCED GRINDING WHEEL
[75] Inventor: Björn Malm, Vastervik, Sweden
[73] Assignee: AB Slipmaterial-Naxos, Sweden
[21] Appl. No.: 704,565
[22] Filed: July 12, 1976
[30] Foreign Application Priority Data
July 23, 1975 Sweden .............................. 7508412
[51] Int. Cl.² .............................................. B24D 7/00
[52] U.S. Cl. ................. 51/207; 51/206 NF; 51/297
[58] Field of Search ............. 51/206 NF, 207, 209 R, 51/297

[56] References Cited
U.S. PATENT DOCUMENTS

| 1,290,990 | 1/1919 | Hickey | 51/209 R |
|---|---|---|---|
| 1,970,835 | 8/1934 | Benner | 51/209 R |
| 2,268,663 | 1/1942 | Kuzmick | 51/206 NF |
| 2,353,864 | 7/1944 | Wooddell | 51/209 R |
| 2,690,632 | 10/1954 | Sevick | 51/207 |
| 3,136,614 | 6/1964 | Kuzmick | 51/297 |
| 3,271,911 | 9/1966 | McKenna | 51/206 R |
| 3,597,884 | 8/1971 | Kaarlela | 51/207 |
| 3,716,950 | 2/1973 | McClure | 51/207 X |
| 3,838,543 | 10/1974 | Lakhani | 51/206 NF |
| 3,919,580 | 11/1975 | Helletsberger | 51/206 NF |

FOREIGN PATENT DOCUMENTS 621,795   4/1949   United Kingdom.

Primary Examiner—Gary L. Smith
Attorney, Agent, or Firm—Burns, Doane, Swecker & Mathis

[57] ABSTRACT

The noise and vibrations produced by a grinding wheel can be reduced if the wheel is composed of two or more grinding discs joined together by means of layers of a polymer material having a thickness of at least 0.2 mm and not greater than the thickness of the grinding discs. The discs shall have a ratio of diameter to thickness of at least 10. The polymer material shall have a hardness below 90 Shore A, and a loss factor of at least 0.25.

6 Claims, 2 Drawing Figures

U.S. Patent  Dec. 13, 1977  4,062,153

SILENCED GRINDING WHEEL

In grinding and other cutting machining methods oscillations and vibrations occur in the tool, in the machine and in the workpiece. These vibrations are propagated in the air in the form of undesirable noise. During manual grinding they are propagated to the arms and hands of the operator.

Noise has a generally disorganised oscillation at a vast number of frequencies. The risk of damaging the hearing organs is a function of both the so-called sound pressure and the frequency. The permissible exposure time decreases at a certain sound pressure when the frequency increases. At 250 Hz the maximum permissible sound pressure is approximately 90 dB for more than five hours continuous exposure, whereas the corresponding value is 80 dB at 8000 Hz. A drop in the sound pressure by 8 - 10 units is usually felt as a drop by half of the noise level. It is therefore desirable for the noise level to be reduced over the whole frequency range, but the significance is greatest at high frequencies.

Vibrations have a tiring effect on the hands and arms of the operator. It is well known that serious damage may be caused if the operator is subjected to vibrations over a long period.

Various measures are possible in order to reduce the level of vibration in grinding machines and accessories. In the case of a stationary machine vibrations in the workpiece can be reduced by firm clamping in the machine. If the workpieces are slim suitable supports can give good results. From the point of view of oscillation the grinding wheel is often unfavourably shaped, having slight thickness in relation to the diameter. This may cause considerable vibration, resulting in an extremely high noise level. The vibrations are propagated to the operator during manual grinding, resulting in the drawbacks outlined above.

The object of this invention is to produce a grinding wheel which, due to its construction, does not give rise to such strong vibrations as conventional wheels, thus considerably reducing the drawbacks mentioned above. The invention can be used in grinding wheels containing any type of abrasive particles desired, and for grinding wheels in which a ceramic or plastic binder is used for the abrasive particles.

The grinding wheel according to the invention consists of two or more grinding discs joined together, and is characterized in that the ratio between diameter and thickness of the discs is at least 10, that they are joined together by layers of polymer material having a thickness of at least 0.2 mm and not greater than the thickness of the grinding discs, and that the polymer material has a hardness below 90 Shore A and a loss factor of at least 0.25.

The grinding discs are joined together by means of the polymer material, this constituting the silencing material. The polymer material may therefore constitute the adhesive joining two adjacent grinding discs. The most convenient procedure is for the polymer material to be applied in the form of a solution or paste or in liquid or molten state, as a layer of the desired thickness between two grinding discs, and then be allowed to dry, cure or solidify so that it joins the two discs firmly together. Alternatively, a layer of polymer material may be manufactured first and then adhered in known manner between two grinding discs.

The polymer material may be solid or porous. The hardness of the polymer material should be less than 90 Shore A, preferably 30 - 80 Shore A. The hardness should be above 10 Shore A, since a softer material cannot join two grinding discs in a reliable manner.

The polymer material shall have a loss factor of at least 0.25, preferably at least 0.4. The loss factor is a property of the material which varies between 0 and 1. The loss factor indicates the capacity of the material to absorb the energy of vibrations. It is dependent on the frequency of the vibration and on the temperature of the material. The values stated above apply at 20° C and frequencies below 100Hz.

The "loss factor" referred to above is "dimensionless" and does not possess a unit. The loss factor is the tangent of the "loss angle" $\delta$:

$$\tan \delta = (E''/E')$$

$E'$ is the "real" component of the modulus of elasticity. For a low or medium loss factor said modulus is the same as Young's modulus. $E''$ is the imaginary component of the modulus, and is often referred to as the "modulus of loss". The angle is the phase angle of stress $\sigma$ to strain $\varepsilon$.

$$E = \sqrt{(E')^2 + (E'')^2} = \sigma_{max}/\varepsilon_{max}$$

E is referred to as the "complex module". Further information concerning the loss factor can be found in "Technical Review No. 4, 1972" issued by Brüel & Kjaer, Närum, Denmark, and in publication No. 3930 "Instructions and Applications for Complex Modulus Apparatus type 3930" issued by the same company.

A thermoplastic resin, such as polyethylene or polyvinyl plastic can be used as polymer material. However it is preferred to use a plastic which can be cured by heat treating. Particularly preferred is a polyurethane which, as known, is manufactured by reaction between a polyol and an isocyanate. The polyol may be of polyester or polyether type. It has been found that polyols of polyester type are particularly suitable for this purpose, especially castor oil and modified castor oil esters. Toluene diisocyanate (TDI) and diphenyl methane diisocyanate (MDI) are preferred for the isocyanate. With castor oil or derivatives thereof these isocyanate types give a polyurethane with a loss factor of 0.4 - 0.7 within the wide hardness range of 10 - 70 Shore A. While still retaining a good loss factor, therefore, the most suitable hardness for the polymer material can be selected with respect to the grinding wheel concerned. A polyurethane is preferred which has been formed by reaction between 55 - 80, preferably 60 - 75 percent by weight castor oil, or derivative thereof, and 20 - 45, preferably 25 - 40, percent by weight TDI or MDI.

The thickness of the silencing layer can be varied according to the properties desired for the grinding wheel. It shall, however, be at least 0.2 mm in thickness and should not be thicker than the adjacent grinding discs. These discs shall be relatively thin, by which is meant that the ratio of diameter to thickness shall be at least 10. The composite grinding wheel should have a diameter to thickness ratio of at least 4.

Figure 2:
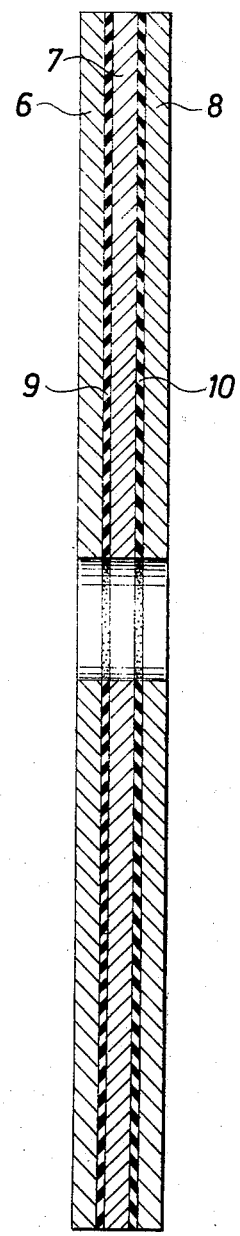

Grinding wheels in accordance with the invention are illustrated in FIGS. 1 and 2.

FIG. 1 shows a so-called depressed center wheel which is useful for various manual grinding operations. It consists of two grinding discs 1, 2 having a depressed center portion 3 and a central opening 4. The discs 1, 2 are joined together by means of a layer 5 of a polymer material having vibration reducing properties. FIG. 2 shows a straight grinding disc consisting of three grinding discs 6 – 8 joined together by two layers 9, 10 of polymer material having vibration reducing properties.

EXAMPLE

A grinding wheel of the type shown in FIG. 1 was manufactured as follows: Two grinding discs were manufactured in known manner. The abrasive particles consisted of alumina (corundum) and the binder consisted of phenoplast with pyrite and potassium fluoroborate as filler. The discs had a diameter of 230 mm and a thickness of 3.5 mm. One disc was placed horizontally, and 90 g of a mixture consisting of 100 parts by weight caster oil and 45 parts by weight isocyanate of diphenyl methane diisocyanate type (MDI) (marketed by Farbenfabriken Bayer AG under the name Desmodur 44V) was applied on the upper surface. The second disc was placed on top of this mixture and the discs were pressed together so that a layer of moulded plastic about 1 mm thick was obtained between them. The composite disc was allowed to cure at room temperature for 15 hours, after which time it was heat-cured for 15 hours at 90° C. The hardness of the silencing layer was approximately 70 Shore A, the dynamic elasticity module was approximately 22 MPa, and the loss factor was approximately 0.55. The grinding wheel produced in this manner acquired a "combined loss factor" which lay between 0.9 and 1. The grinding wheel had a resonance frequency of 70 Hz. By way of comparison it may be mentioned that a conventional grinding wheel with the same diameter has a resonance frequency of 420 Hz if its thickness is 7 mm and 640 Hz if its thickness is 10 mm. In general, the vibration reducing effect is better the lower the resonance frequency is.

Comparative grinding experiments were performed using grinding wheels constructed as described above and conventional depressed center wheels with an ordinary portable pneumatic grinding machine. The table below shows the sound pressure at various frequencies.

| Grinding Wheel | Dimensions (mm) | Frequency (Hz)* 250 | 1000 | 4000 | 8000 | 16000 | 31500 |
|---|---|---|---|---|---|---|---|
| | | | Sound Pressure dB | | | | |
| Conventional wheel No. 1 | 230×7×22 | 94 | 100 | 96 | 90 | 104 | 100 |
| Conventional wheel No. 2 | 230×10×22 | 90 | 90 | 94 | 87 | — | — |
| Grinding wheel acc. Example | 230×8×22 | 80 | 85 | 76 | 76 | 82 | 64 |

*Diameter of wheel × thickness × diameter of central opening.

As can be seen, the invention results in a decrease in the sound pressure at all examined frequencies. The decrease is greatest at the highest frequencies. The grinding wheel according to the invention thus results in a considerable reduction of noise.

With respect to vibrations propagated from the grinding wheel to the hands and arms of the operator, a considerable decrease was observed during grinding with wheels manufactured in accordance with the invention, and the operator therefore felt that these wheels were considerably more pleasant and less tiring to grind with than similar conventional grinding wheels.

I claim:

1. Grinding wheel consisting of two or more grinding discs joined together, wherein the ratio of diameter to thickness of the discs is at least 10, said discs are joined together by means of layers of polymer material having a thickness of at least 0.2mm and not greater than the thickness of the discs, and the polymer material has a hardness below 90 Shore A and a loss factor of at least 0.25.

2. Grinding wheel according to claim 1, wherein the hardness of the polymer material is 30 – 80 Shore A.

3. Grinding wheel according to claim 1, wherein the composite wheel has a diameter to thickness ratio of at least 4.

4. Grinding wheel according to claim 1, wherein the polymer material is a polyurethane.

5. Grinding wheel according to claim 4, wherein the polyurethane has been produced by reaction between 55 – 80, preferably 60 – 75, percent by weight castor oil, or a derivative thereof, and 20 – 45, preferably 25 – 40, percent by weight isocyanate of toluene diisocyanate or diphenyl methane diisocyanate type.

6. Grinding wheel according to claim 1, in which the loss factor of the polymer material is at least 0.4.

* * * * *